Oct. 7, 1969    G. F. EVESON ET AL    3,471,016
FLUIDISED-BED APPARATUS
Filed Sept. 11, 1967    2 Sheets-Sheet 1
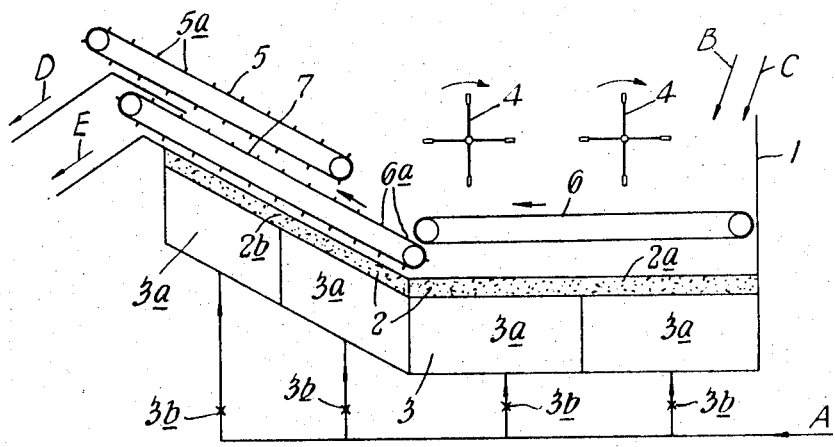
FIG. I.
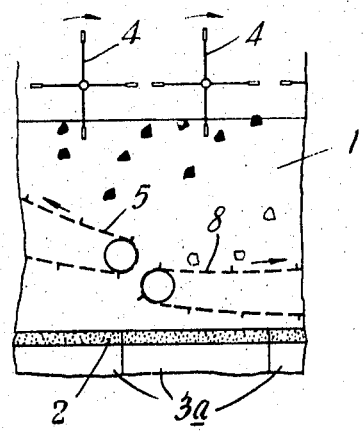
FIG. 3.
Inventors
Geoffrey F. Eveson,
Alfred Thompson
by Sommers & Young
Attorneys

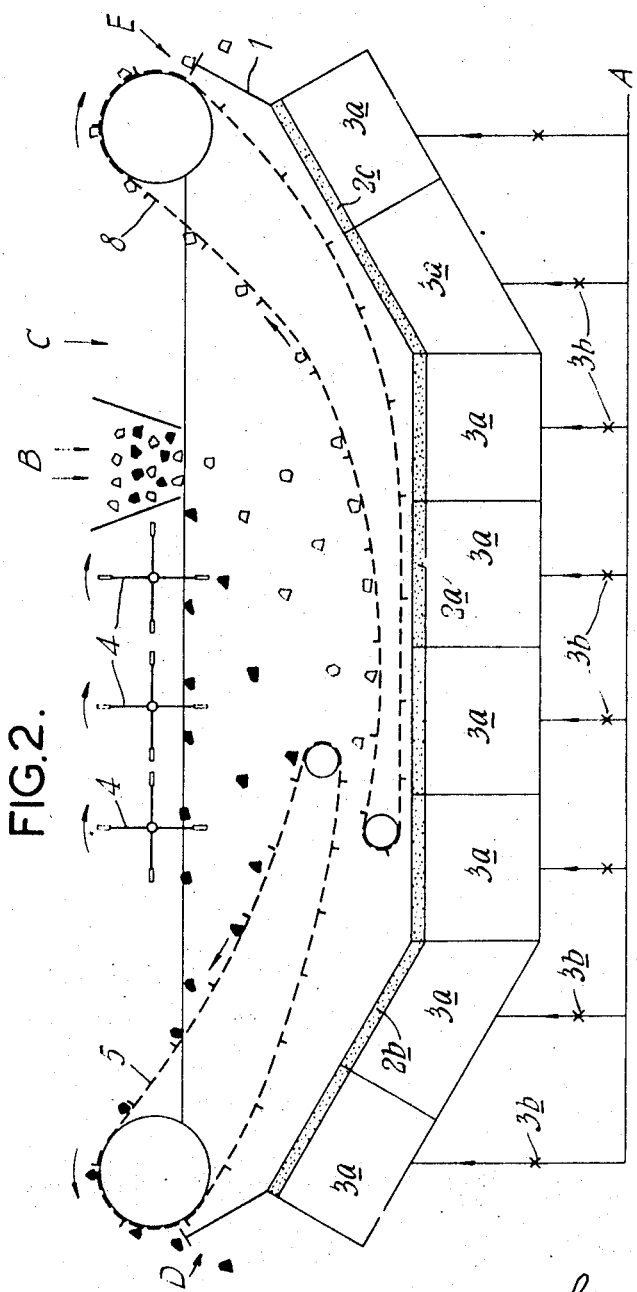

United States Patent Office 3,471,016
Patented Oct. 7, 1969

3,471,016
FLUIDISED-BED APPARATUS
Geoffrey Frank Eveson, Sheffield, and Alfred Thompson, Eyam, England, assignors to Head, Wrightson & Company Limited, Yorkshire, England, a corporation of Great Britain
Filed Sept. 11, 1967, Ser. No. 666,720
Claims priority, application Great Britain, Sept. 13, 1966, 40,807/66
Int. Cl. B07b 3/02
U.S. Cl. 209—470                                   9 Claims

ABSTRACT OF THE DISCLOSURE

Fluidised-bed apparatus comprising a vessel containing a particulate fluidised bed, the vessel having a gas-pervious base with a first part which is horizontal and one or more further parts which slope upwardly from the first part as a continuation thereof, and a conveyor or conveyors arranged within the fluidised bed and extending over the horizontal and the one or more sloping parts of the gas-pervious base to convey products treated in the fluidised bed out of the bed.

---

This invention relates to fluidised-bed treament apparatus and has advantageous application in the dry-cleaning of large or small coal, and in the treatment of a limited range of ores.

According to one aspect of the invention there is provided fluidised bed apparatus comprising a vessel containing a fluidised particulate bed and having a gas pervious base through which gaseous medium is passed to maintain said bed in a fluidised condition, said gas pervious base comprising a first part which is substantially horizontal and at least one further part which slopes upwardly from said first part as a continuation thereof, and conveyor means extending over said parts of said gas-pervious support to convey products treated in said fluidised bed along said first part and out of said bed over said further part.

According to another aspect of the invention, there is provided an apparatus for treating particulate material containing components of different densities in a fluidised particulate bed having an effective density to cause a first fraction of said particulate material comprising the less dense components to float on said fluidised-bed and a second fraction comprising the denser components to sink through said fluidised-bed, said apparatus comprising a vessel having a gas-pervious base through which gaseous medium is passed to maintain said bed in fluidised condition, said gas pervious base having a first part which is substantially horizontal and at least one further part which slopes upwardly from said first part as a continuation thereof, means for moving particles of said first fraction from over said first part of said gas-pervious base out of said vessel, and conveyor means extending over said first part of said gas-pervious base to collect particles of said second fraction which sink through said bed and to deliver such particles over said further part of said gas-pervious base and out of said bed.

In order that the invention may be readily understood, three forms of apparatus in accordance therewith for the dry-cleaning of coal will now be described by way of example with reference to the accompanying diagrammatic drawings, in which:

FIG. 1 is a side elevation of one such form of apparatus,

FIG. 2 a similar view of a second form of apparatus, and

FIG. 3 a fragmentary similar view illustrating a modification of the apparatus of FIG. 2.

The apparatus illustrated diagrammatically in FIG. 1 consists of a stationary vessel 1 provided with a porous base 2 of which a part 2a is horizontal—or nearly so—and the remainder 2b is inclined at a relatively steep angle to the horizontal, for example 30°. A chest 3 is arranged beneath the porous base 2 and is divided into compartments 3a to which air or other gas is supplied from a source at A. Provision is made, as diagrammatically shown by the valves 3b, to control the mass flow rate of gas to each compartment 3a in order to achieve uniform fluidisation of magnetite—or any other appropriate particulate materials—forming the fluidised-bed within the vessel 1.

Raw coal is admitted to the vessel 1 at B and magnetite at C, the coal is separated into two fractions, namely the floats product, which is cleaned coal, and the sinks product or discard. The particles of cleaned coal which float on the fluidised-bed due to the effective density of the bed are swept by rotating paddles 4—or any equivalent rotating or reciprocating device or endless scraping device—towards an extraction conveyor 5. This conveyor, which extends across the full width of the vessel 1, is driven at its upper end while its lower end is immersed in the fluidised-bed. The conveyor 5 is made of interlocking steel mesh—or any similar perforate material—and it may be convenient to fit shallow flights 5a at intervals along its surface. Particularly if the slope of the conveyor 5 is relatively steep, these flights will facilitate removal of cleaned coal particles from the fluidised-bed. With steep inclination slippage would tend to occur between the particles and a perforate conveyor not fitted with flights. The size of the perforations in the conveyor is such that magnetite particles and gas bubbles can pass readily through the perforations, whereas particles of the raw coal cannot; for this reason, the raw coal normally would not contain much material finer than, say ¼ in. or ⅛ in. As the cleaned coal particles resting on the conveyor 5 are raised above the surface of the fluidised-bed, particles of magnetite fall through the perforations in the conveyor and return to the vessel 1 and cleaned coal particles are discharged from the conveyor at D relatively free from magnetite.

Particles of discard fall onto a conveyor 6 which may be made from one of the same range of materials as is used for conveyor 5. The conveyor 6, which also extends across the full width of the vessel 1 will normally be horizontal or nearly so. It may, or may not, have flights 6a fitted to its surface. It is driven from a motor arranged outside the vessel 1. Discard particles are carried away by the conveyor 6 and are dopsited on a discard-extraction conveyor 7 which is similar in construction to the conveyor 5 and also extends across the full width of the vessel 1. Discard particles are discharged at E from the upper end of the conveyor 7 relatively free from magnetite.

The vessel 1 may be provided with a discharge port (not shown) in, or near, its base so that from time to time (e.g. at the end of a working shift) the contents of the vessel (i.e. magnetite plus particles of the raw coal remaining within the vessel) can be removed. This procedure would prevent any undue accumulation of discard or other particles beneath the lower strands of the conveyors. The magnetite particles would be recovered from the associated raw coal particles by dry screening, or some similar known method, and returned to a magnetite bunker.

If it is considered that adequate separation of magnetite from the products of coal separation does not occur naturally on the conveyors 5 and 7, it is possible to arrange for air jets to blow onto particles on the upper strand of each conveyor. The air would promote the removal of magnetite from the surfaces of these particles.

It will be understood that it may not be practicable to ensure that the particles of cleaned coal and discard on the conveyors 5 and 7 respectively are completely free from magnetite. Final traces of magnetite may be removed by passing the products over fixed or moving screens having apertures of suitable dimensions. These screens may be external to the vessel 1, in which case the recovered magnetite would be returned to the circulating magnetite. It is desirable to remove some magnetite continuously from the vessel 1 in order that the concentration of fine, non-magnetic, contaminants (arising from the raw coal) in the magnetite does not rise above some maximum acceptable level. This may be effected by means of a weir in the side of the vessel 1. The contaminating material may be separated from the magnetite by known methods. Magnetite is added to the vessel 1 to replace that discharged with the products of separation.

The raw coal may be sized and dried before being fed to the separating vessel 1. If the free moisture content of the raw coal is relatively low, the magnetite may be heated so that the raw coal is simultaneously dried and cleaned in the separating vessel. The magnetite may be heated outside the vessel 1 or by heating means, for example, heating coils, in the said vessel. Alternatively or in addition, the fluidising gas supplied may be heated externally of the vessel 1.

The basic form of apparatus shown in the drawing may be varied so that the two products of separation are removed from the vessel, not in line as shown, but at 180° or, less advantageously, at right angles to each other. The shape of the vessel would naturally have to be modified to suit these variations.

A form of apparatus in which the products of separation are removed from the vessel 1 at 180° to each other is shown in FIG. 2. In this form of apparatus, the function of the two conveyors 6 and 7 of FIG. 1 is effected by a single conveyor 8. The porous base 2, with the compartmentalised chest 3 below it, is extended from horizontal part 2a by inclined parts at both ends, 2b and 2c respectively. The coal and magnetite are again supplied at B and C. In FIG. 2, the lower end of the conveyor 5 overlaps the adjacent end of the conveyor 8. In the modification shown in FIG. 3, the ends of the conveyors 5 and 8 do not overlap. The arrangement of FIG. 2 requires a deeper fluidised bed of magnetite than that of FIG. 3. These two arrangements are otherwise similar to that of FIG. 1 and operate in essentially the same manner.

An arrangement in which the separation products are removed at right angles to each other would involve the employment of a deeper bed of magnetite than do the arrangements described above.

Advantages of the apparatus described above over those described, for example, in Patent No. 3,367,501 include:

(a) a stationary (i.e. non-vibratory) separating vessel is used,
(b) the rate of recirculation of magnetite to the vessel is less, since a relatively small amount is discharged with the products of separation,
(c) paddles and conveyors are used to promote the positive removal of both products from the vessel, thereby giving a high capacity and minimising the accumulation of midlings material within the vessel.

In place of magnetite alone, use may be made, as fluidised particulate material, of a homogeneous mixture of, for example, sand and magnetite. If the material to be treated is an ore, the fluidised material may be derived from that ore. For instance, if the material to be treated is raw iron ore, the fluidised material may be finely divided iron oxide obtained by crushing and/or screening the raw ore or a concentrate prepared from the said ore.

Apparatus in accordance with the invention can be applied to purposes other than those of coal cleaning and specific-gravity separation of ores. For example, it may be employed in the recovery of used foundry sand, in which it is necessary to remove agglomerates of sand particles from discrete particles which can be re-used and, if possible, to cool the sand at the same time. Apparatus similar to that described above can be used for this purpose, but the conveyor 5 is not required. The relatively hot foundry sand is fed continuously into the vessel 1, in which the discrete sand particles are fluidised to form the fluidised particulate bed having an effective density less than that of the sand particles themselves, and consequently cooled, with cold air, suitably at atmospheric temperature, supplied to the chest 3. Agglomerates of sand which do not become fluidised and which therefore have a density greater than the effective density of the fluidised bed sink through the fluidised bed and are removed by the conveyors 6 and 7 or 8. The cooled, discrete, sand particles to be recovered leave the vessel 1 through an overflow weir, in the side of the vessel, similar to the weir referred to above for the continuous removal of magnetite in order to keep contamination at an acceptably low level.

Another application of the apparatus in accordance with the invention is in the heat-treatment of certain artefacts, where a fluidised bed of heated particulate material could be maintained in the vessel. The artefacts could be placed on an endless, perforated conveyor which, for part of its total travel, dips below the surface of the fluidised medium in the vessel.

We claim:

1. Fluidised bed apparatus comprising a vessel containing a fluidised particulate bed and having a gas pervious base through which gaseous medium is passed to maintain said bed in a fluidised condition, said gas pervious base comprising a first part which is substantially horizontal and at least one further part which slopes upwardly from said first part as a continuation thereof, and endless conveyor means comprising at least one endless conveyor band for supporting products treated in the fluidised bed and perforated to allow the passage therethrough of the fluidised particulate bed material and disposed to provide a conveying run for said products, which conveying run follows the contour of said base and is within the depth of said bed along said first part of said base and proceeds upwardly from within the depth of said bed to a position outside said bed along said further part.

2. Apparatus for treating particulate material containing components of different densities in a fluidised particulate bed having an effective density to cause a first fraction of said particulate material comprising the less dense components to float on said fluidised bed and a second fraction comprising the denser components to sink through said fluidised bed, said apparatus comprising a vessel having a gas pervious base through which gaseous medium is passed to maintain said bed in fluidised condition, said gas pervious base having a first part which is substantially horizontal and at least one further part which slopes upwardly from said first part as a continuation thereof, means for moving particles of said first fraction from over said first part of said gas pervious base out of said vessel, and endless conveyor means comprising at least one endless conveyor band perforated to allow the passage therethrough of the fluidised particulate bed material and disposed to provide a conveying run which follows the contour of said base and is within the depth of said bed along said first part, and proceeds upwardly from within the depth of said bed to a position outside said bed along said further part, whereby to collect particles of said second fraction which sink through said bed and to deliver the particles of said second fraction so collected, out of said bed.

3. Apparatus as claimed in claim 2, wherein said means for moving particles of said first fraction from over said first part of said gas-pervious support comprises sweeping means for sweeping said first fraction onto extraction conveyor means which deliver said first fraction out of said vessel and which extend along said further part of said gas-pervious base above said endless conveyor means.

4. Apparatus as claimed in claim 2, wherein said vessel has a weir in one side-wall part whereby particulate bed material can be removed from said vessel by overflow.

5. Apparatus as claimed in claim 2, wherein said conveyor means comprises a first endless conveyor band extending along said first part and a second endless conveyor band extending along said further part and arranged to receive particles of said second fraction from said first endless conveyor band.

6. Apparatus as claimed in claim 2, wherein said conveyor means comprises a single endless conveyor band.

7. Apparatus as claimed in claim 2, wherein said gas-pervious base is formed of porous material.

8. Apparatus as claimed in claim 2, wherein said vessel has two said further parts extending from opposite ends of said first part, said means for moving particles of said first fraction from over said first part comprises sweeping means and extraction conveyor means for delivering said first fraction swept onto it by said sweeping means out of said vessel, said extraction conveyor means extending along the opposite one of said two further parts to said endless conveyor means.

9. Apparatus as claimed in claim 8, wherein said endless conveyor means and said extraction conveyor means have their lower ends closely adjacent one another.

References Cited

UNITED STATES PATENTS

| | | | |
|---|---|---|---|
| 1,477,006 | 12/1923 | Riley et al. | 209—492 X |
| 2,108,290 | 2/1938 | Levin et al. | 209—172.5 |
| 2,271,417 | 1/1942 | Dull | 209—463 |
| 2,310,894 | 2/1943 | Brusset | 209—467 |
| 2,563,086 | 8/1951 | Verschoor | 209—5 |
| 2,721,658 | 10/1955 | Tromp | 209—172.5 |
| 2,724,502 | 11/1955 | Ridley | 209—172.5 |
| 3,268,071 | 8/1966 | Puddington et al. | 209—5 |
| 3,367,501 | 2/1968 | Eveson | 209—467 |

FOREIGN PATENTS

| | | |
|---|---|---|
| 1,041,305 | 5/1953 | France. |
| 946,480 | 1/1964 | Great Britain. |
| 120,697 | 1/1959 | U.S.S.R. |

TIM R. MILES, Primary Examiner

U.S. Cl. X.R.

209—474